NITRATE REMOVAL FROM SEWAGE
Filed March 16, 1971 2 Sheets-Sheet 1
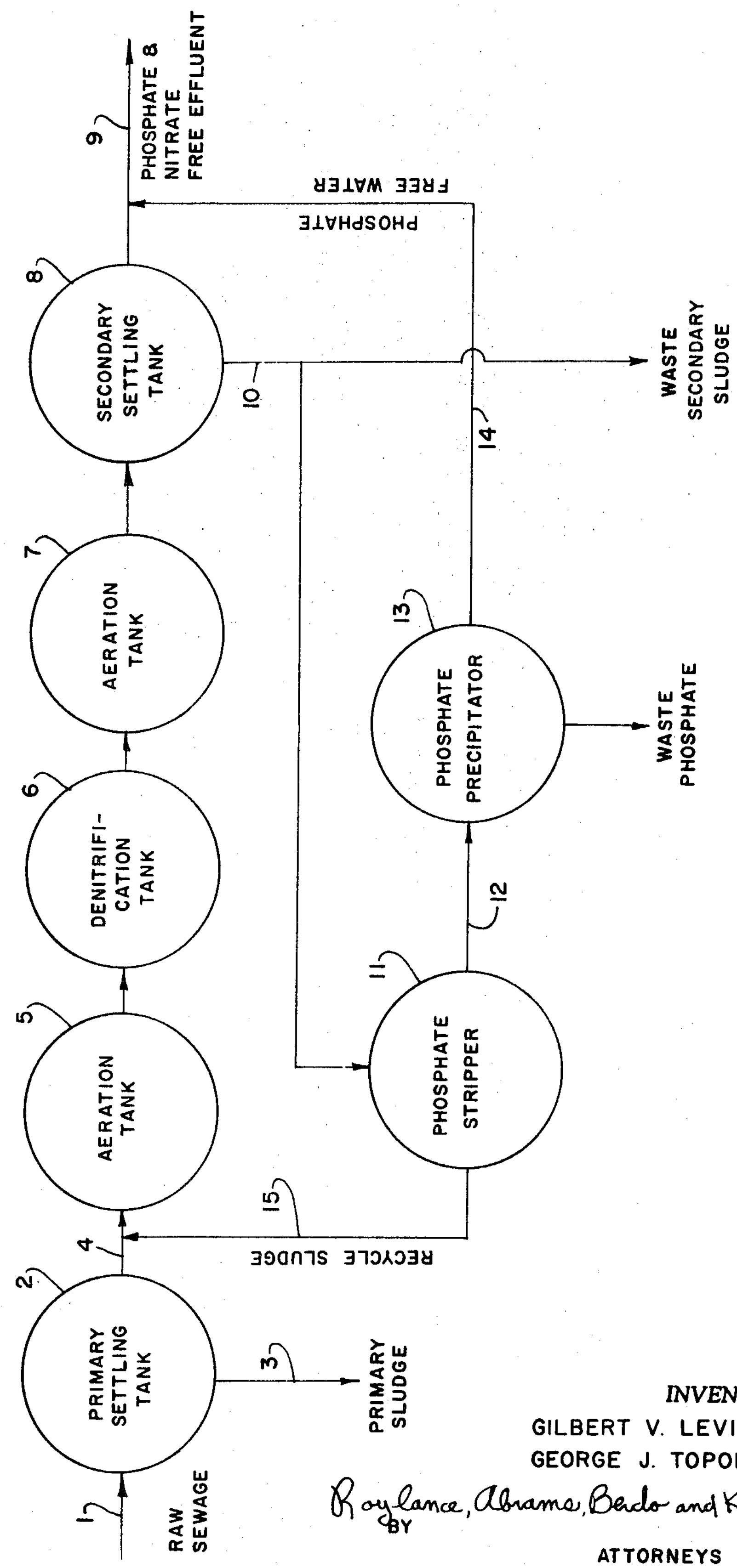
INVENTOR.
GILBERT V. LEVIN
GEORGE J. TOPOL
BY Roylance, Abrams, Berdo and Kaul
ATTORNEYS NITRATE REMOVAL FROM SEWAGE
Filed March 16, 1971 2 Sheets-Sheet 2
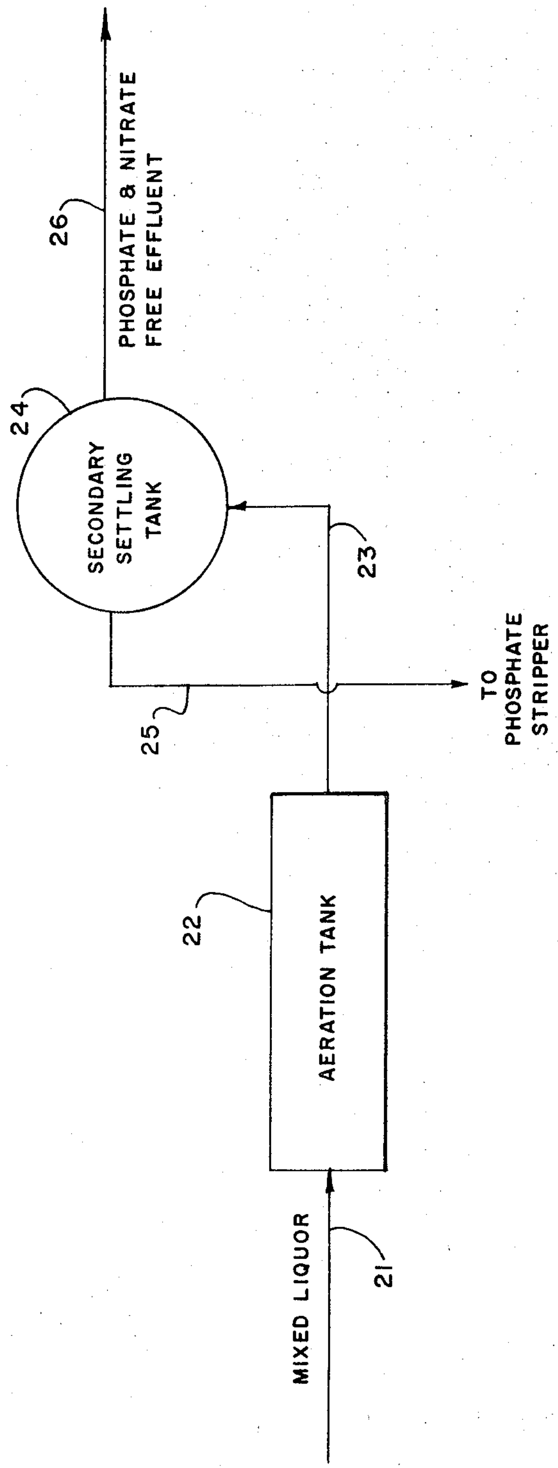
INVENTOR.
GILBERT V. LEVIN
GEORGE J. TOPOL
BY Roylance, Abrams, Berdo and Kaul
ATTORNEYS United States Patent Office 3,654,147

Patented Apr. 4, 1972

3,654,147

NITRATE REMOVAL FROM SEWAGE

Gilbert V. Levin, Chevy Chase, and George J. Topol, Silver Spring, Md., assignors to Biospherics Incorporated, Rockville, Md.

Filed Mar. 16, 1971, Ser. No. 124,716
Int. Cl. C02c *1/06*
U.S. Cl. 210—6 3 Claims

ABSTRACT OF THE DISCLOSURE

There is disclosed an activated sludge sewage treatment process in which the nitrogen content of raw sewage is removed. In the process, raw sewage is mixed with activated sludge to form a mixed liquor and the mixed liquor is aerated at a rate sufficient to convert ammonia present in the sewage to nitrate. The mixed liquor is then passed to a zone wherein it is maintained under conditions in which there is insufficient oxygen present to satisfy the needs of the microorganisms in the mixed liquor. This causes the microorganisms to break down the nitrate and to fulfill their oxygen needs by obtaining oxygen from the nitrate. Nitrogen gas is formed in the process and is evolved from the system.

There is also disclosed a process whereby the phosphate content of sewage is also reduced. In this embodiment, conditions are controlled so that the sludge which is withdrawn from the mixed liquor contains a substantial portion of the phosphate content. The final effluent which is passed out of the system is substantially free of phosphate and nitrate.

This invention relates to a process for treating raw or treated sewage to obtain an effluent substantially free of nitrogen-containing compounds which is returned to natural water resources. Another aspect of this invention relates to a process for removing both nitrogen-containing compounds and phosphates from sewage.

In the conventional activated sludge system in use today, sewage is subjected to the usual screening and preliminary sedimentation procedures, then mixed with activated sludge recycled from a settling tank to form a mixed liquor and the mixed liquor is subjected to aeration. During aeration of the mixed liquor, the organisms present cause the aerobic decomposition of solids, and a high degree of BOD removal is achieved.

Phosphates and nitrogen-containing compounds such as ammonia, which are present in organic waste and detergents, escape conventional sewage treatment processes and are released with the effluent into natural water resources, e.g., lakes, rivers and streams. These phosphate- and nitrogen-containing compounds result in over fertilization or eutrophication of waters causing unsightly algal blooms and serious pollution problems.

It is known that aeration of the mixed liquor in an activated sludge sewage treatment process initially causes the microorganisms present to take up phosphate and that extended aeration results in the release of phosphates taken up by the sludge microorganisms in the early period of aeration. Thus, it has been reported that maximum phosphate uptake occurs by approximately the sixth hour of aeration and that after 8 hours of aeration, phosphate is released by the microorganisms, with essentially complete release of the phosphate taken up occurring after continued aeration.

U.S. Pat. No. 3,236,766 discloses a process for removing phosphates from sewage. According to the process disclosed in that patent, the pH of raw sewage is adjusted, if necessary, to maintain a range of from about 6.2 to about 8.5, the sewage is mixed with activated sludge to form a mixed liquor, the mixed liquor is aerated to maintain a dissolved oxygen content of at least 0.3 mg. per liter in the mixed liquor and a phosphate-enriched sludge is separated from the mixed liquor to provide a substantially phosphate-free effluent. The phosphate-enriched sludge is treated to reduce the phosphate content thereof prior to recycling for mixing with the influent sewage. This is accomplished by maintaining the phosphate-enriched sludge in an anaerobic condition for a period of time or at a pH of less than 6.5 for about 10 to 20 minutes. The anaerobic condition and the acidic pH induce considerable quantities of intracelluar phosphate to leak out of the sludge into the liquid phase.

Several other processes have since been proposed for reducing the phosphate content of phosphate-enriched sludge following the aeration step in an activated sludge sewage treatment process. Thus, U.S. Pats. Nos. 3,385,785 and 3,390,077 disclose adjusting the pH of phosphate-enriched sludge to between about 3.5 and 6.0 and agitating the sludge in contact with a low phosphate-containing aqueous medium for a time sufficient to effect transfer of water-soluble phosphate material from the sludge to the aqueous phase. The phosphate-enriched aqueous medium is separated from the phosphate-depleted sludge and the phosphate-depleted sludge is recycled to form the mixed liquor.

U.S. Pat. No. 3,522,171 also discloses a method of treating sludge to reduce the phosphate content prior to recycling as seed material in the aeration zone of an activated sludge sewage treatment system. The method disclosed in this patent involves subjecting a first sludge concentrate produced in the separator successively to acidification followed by separation of a second sludge concentrate. This concentrate is diluted with a low phosphate content aqueous medium and a third sludge concentrate is separated which is the reduced phosphate content concentrate of microorganisms to be recycled.

U.S. Pats. Nos. 3,423,304 and 3,409,545 disclose processes for reducing both the phosphate content and the ammonia content of raw sewage. These patents disclose the combination of a chemical phosphate precipitating treatment with biological phosphate removal in a sewage treatment process. Ammonia gas is removed in a stripping tower before the system becomes an activated sludge process.

It is an object of this invention to provide a process for reducing the content of the nitrogen-containing compounds and for promoting a high degree of BOD removal in an activated sludge sewage treatment process.

It is another object of this invention to provide such a process which also reduces the phosphate content of the sewage.

These and other objects are attained by the practice of this invention which, briefly, comprises mixing influent sewage material with activated sludge to provide a mixed liquor. The mixed liquor is passed to an aeration zone wherein it is aerated at a rate sufficient to reduce the BOD content thereof and to convert ammonia present in the sewage to nitrate. Under conditions of sufficiently high aeration, e.g., at least about 2 cubic feet of air per gallon of mixed liquor, Nitrosomonas bacteria present in the mixed liquor convert ammonia in the raw sewage to nitrate and Nitrobacter bacteria convert nitrite to nitrate. The mixed liquor is then passed to a zone wherein it is maintained under conditions in which there is insufficient oxygen present to satisfy the metabolic needs of the microorganisms in the mixed liquor—i.e., under anaerobic or semi-aerobic conditions. This induces denitrifying microorganisms present to break down the nitrate content. These microorganisms present in the sludge obtain oxygen by the reduction of the nitrate content. Nitrogen gas is formed in the process and is evolved from the system. Nitrate-depleted sludge is separated from this zone to provide a substantially nitrate-free effluent. The sludge is then recycled for mixing with influent sewage material.

In a preferred embodiment of this invention, conditions are controlled such that the sludge which is separated from the substantially nitrate-free effluent contains a substantial portion of the phosphate originally present in the influent sewage. The phosphate-enriched sludge is then passed to a phosphate stripping zone and treated to cause the microorganisms in the sludge to release phosphate. On settling, there results a phosphate-enriched supernatant liquor and a phosphate-depleted sludge. The sludge is then separated from the phosphate-enriched supernatant liquor and is recycled for mixing with influent sewage material in the activated sludge sewage treatment process. By the practice of this embodiment of this invention, both the phosphate and the nitrate content of raw sewage is substantially lowered.

The invention is illustrated in the accompanying drawings wherein FIGS. 1 and 2 are flow diagrams of alternative preferred embodiments of this invention.

A raw sewage influent stream 1 is passed through conventional screening and grit removing units and is optionally subjected to primary settling in a tank 2 from which primary sludge is removed in line 3. The primary settled sewage is mixed with recycled, activated sludge hereinafter described to form a mixed liquor and is passed by line 4 to the aeration tank 5.

In the aeration tank 5, the mixed liquor is aerated at a rate sufficient to convert ammonia present in the sewage to nitrate. During aeration, the bacteria present take up phosphate and consume organic matter present in the sewage. A high degree of BOD removal is obtained during aeration.

After aeration, the mixed liquor is fed into a tank 6 wherein it is maintained under conditions in which there is insufficient oxygent present to satisfy the needs of the microorganisms in the mixed liquor. This induces the microorganisms to consume the nitrate content of the sewage.

After depletion of the nitrates and release of the nitrogen as nitrogen gas, the mixed liquor is passed to the aeration tank 7 in which it is again aerated. In this tank, the microorganisms in the sludge take up any phosphate which has leaked out during the period the mixed liquor was in the tank 6. This step, and the phosphate stripping operation hereinafter described, may be omitted if it is only desired to remove nitrogen in the sewage—i.e., wherein phosphate removal is not required.

After aeration in the tank 7, the mixed liquor is fed into a secondary settling tank 8. In the secondary settling tank 8, phosphate-enriched sludge settles and thereby separates from the mixed liquor. The sludge contains a substantial portion of the phosphate present in the sewage. The substantially phosphate-free and nitrate-free effluent is discharged for disposal in a conventional manner by line 9.

The phosphate-enriched sludge is removed from the settling tank by line 10. A portion of the sludge may be delivered to waste and the remainder is passed to the phosphate stripper 11. In the phosphate stripper 11, the phosphate-enriched sludge is treated to cause the microorganisms in the sludge to release phosphate. This treatment may be accomplished by holding the mixture under anaerobic conditions as described in U.S. Pat. No. 3,236,766; by aerating the mixture as described in copending application Ser. No. 112,179, filed Feb. 3, 1971 entitled "Aerobic Removal of Phosphate From Activated Sludge" the disclosure of which is incorporated herein by reference; or by appropriate pH adjustment—i.e., adjusting the pH to less than 6.5 and maintaining it at this pH for at least 10 minutes. This treatment causes the organisms in the sludge to release the phosphate which they have taken up in the aeration tank 5. The phosphate leaks out of the sludge into the liquid phase.

A phosphate-enriched supernatant liquor is produced upon settling of the sludge. After settling, the sludge is passed by line 15 for mixing with the raw sewage which is being fed to the aeration tank 5.

A phosphate-enriched supernatant liquor is produced by the phosphate stripper 11 and is passed by line 12 to the phosphate precipitator 13. A phosphate precipitant, such as aluminum or iron salts or lime, is mixed with the phosphate-enriched supernatant liquor in the phosphate precipitator 13 to precipitate phosphate. The phosphate precipitate may be combined with any waste phosphate-enriched sludge removed from the secondary settling tank 8 and converted into a fertilizer or otherwise disposed of by conventional methods. A phosphate-free superantant liquor is withdrawn from the phosphate precipitator 13 and passed by line 14 to line 9 wherein it is combined with the phosphate-free effluent from the secondary settling tank 8.

Referring to FIG. 2, a mixed liquor formed by mixing recycled activated sludge with primary settled sewage is passed by line 21 to the aeration tank 22 wherein it is aerated at a rate sufficient to cause nitrification of the nitrogen in the raw sewage and to cause the bacteria present to take up phosphate. A high level of dissolved nitrate is thus obtained in the aqueous phase of the sewage. The aerated mixed liquor is then fed by line 23 into the lower portion—e.g., the bottom—of a secondary settling tank 24. The secondary settling tank 24 contains a settled sludge blanket in the bottom portion thereof. Only a limited amount of oxygen is available in the sludge blanket which is insufficient to supply to demands o fthe microorganisms present in the sludge. The flow of the mixed liquor which is introduced beneath the sludge blanket creates a fluidized bed effect—i.e., the mixed liquor trickles up through the sludge particles creating extensive contact between the mixed liquor and the sludge particles. This provides the microorganisms in the sludge with an opportunity to obtain oxygen by reduction of the nitrate present in the aqueous phase of the mixed liquor. Sludge is withdrawn from the secondary settling tank through line 25 at a controlled rate so that the retention time of sludge in the secondary settler is sufficient to permit all nitrate to be consumed but insufficient to cause the microorganisms to release any substantial portion of the phosphate. This point may be determined by monitoring the contents of the secondary settling tank for nitrate and phosphate content. The sludge is then stripped of its phosphate content and recycled for mixing with the raw sewage as described with respect to FIG. 1. An effluent which is substantially free of phosphate and nitrate is withdrawn from the secondary settling tank 24 by line 26.

The following example illustrates a specific embodiment of this invention:

EXAMPLE

The pH of influent raw sewage is adjusted to 7 to 8 and is passed through conventional screening and grit removal units. The raw sewage is mixed with recycled activated sludge having a low phosphate content in an amount sufficient to provide about 15% by volume of return sludge in the mixed liquor. The mixed liquor is then fed at the rate of 15 gallons per hour to an aeration zone wherein it is aerated at a rate of 0.1 liter of air per minute per liter of mixed liquor for six hours. The mixed liquor is then passed to a denitrification tank wherein it is held under anaerobic conditions for 4 hours. During this time, the microorganisms break down the soluble nitrate content of the mixed liquor formed in the aeration tank and nitrogen gas is evolved. The mixed liquor is then again aerated at a rate of 0.1 liter of air per minute per liter of mixed liquor for 2 hours to cause the sludge to take up any phosphate which leaks out during the anaerobic treatment. The aerated mixed liquor is passed to a secondary settling tank. Clarified effluent which is substantially free of phosphate, nitrate and ammonia is discharged to the effluent outflow after chlorination. The phosphate-enriched sludge is passed to a phosphate stripper and sludge thickener wherein it is held under anaerobic conditions for several hours. The conditions existing in the stripper induce considerable quantities of intracellular phosphate to leak out into the liquid phase. The phosphate-depleted sludge is recycled for mixing with incoming raw sewage. The phosphate-enriched supernatant liquid is withdrawn from the settling tank and is fed into a chemical precipitation tank where alum is added and mixed to form a phosphate precipitate. The phosphate precipitate is wasted and the phosphate-depleted effluent is discharged to the effluent outflow along with the clarified effluent from the secondary settling tank. This process removes about 95% of the phosphate and 90% of the ammonia contained in the original raw sewage.

We claim:

1. An activated sludge sewage treatment process which comprises mixing influent sewage with activated sludge to provide a mixed liquor, said influent sewage containing substantially its original phosphate content and from which no phosphate has been chemically precipitated, aerating said mixed liquor at a rate sufficient to reduce the BOD content, convert ammonia present in the sewage to nitrate and cause organisms present to take up phosphates, subsequently maintaining said mixed liquor under conditions in which there is insufficient oxygen present to satisfy the needs of the microorgansims in the mixed liquor whereby denitrification occurs and some phosphate leaks out of the microorganisms, thereafter aerating the mixed liquor to cause the microorganisms in the sludge to take up phosphate which has leaekd out, separating phosphate-enriched sludge from the mixed liquor to provide a substantially phosphate- and nitrate-free effluent, passing said phosphate-enriched sludge to a phosphate stripping zone and treating said phosphate-enriched sludge to cause the microorganisms in the sludge to release phosphate and provide a phosphate-enriched supernatant liquor, recycling said nitrate- and phosphate-depleted sludge and mixing with said influent sewage material.

2. A process as defined in claim 1 wherein said mixed liquor is aerated at a rate of about 0.1 liter of air per liter of mixed liquor.

3. A process as defined in clami 1 wherein said phosphate-enriched sludge is held under anaerobic conditions to cause the microorganisms present to release phosphate.

References Cited

UNITED STATES PATENTS

| | | | |
|---|---|---|---|
| 3,236,766 | 2/1966 | Levin | 210—6 |
| 3,168,465 | 2/1965 | Kraus et al. | 210—7 |

OTHER REFERENCES

Johnson, W. K., et al.: Nitrogen Removal By Nitrification and Denitrification, Journal WPCF, vol. 36, August 1964, pp. 1015–1036 (P.O.S.L.).

Nesbitt, J. B.: Phosphorus Removal—The State of the Art, Journal WPCF, vol. 41, May 1969, pp. 701–713 (P.O.S.L.).

Barth, E. F.: Chemical-Biological Control of Nitrogen and Phosphorus in Wastewater Effluent, vol. 40, December 1968, pp. 2040–2054 (P.O.S.L.).

MICHAEL ROGERS, Primary Examiner

U.S. Cl. X.R.

210—7, 16, 18